(No Model.)

J. F. CRUDGINTON.
ATTACHMENT FOR CUTTING-OFF TOOLS.

No. 547,664. Patented Oct. 8, 1895.

WITNESSES
H. A. Lamb
S. V. Richardson

INVENTOR
James F. Crudginton
By A. M. Wooster
Atty.

UNITED STATES PATENT OFFICE.

JAMES F. CRUDGINTON, OF BRIDGEPORT, CONNECTICUT, ASSIGNOR TO THE ARMSTRONG MANUFACTURING COMPANY, OF SAME PLACE.

ATTACHMENT FOR CUTTING-OFF TOOLS.

SPECIFICATION forming part of Letters Patent No. 547,664, dated October 8, 1895.

Application filed May 16, 1895. Serial No. 549,578. (No model.)

*To all whom it may concern:*

Be it known that I, JAMES F. CRUDGINTON, a citizen of the United States, residing at Bridgeport, in the county of Fairfield and State of Connecticut, have invented certain new and useful Improvements in Attachments for Operating Cutting-Off Tools in Metal-Working Machines; and I do hereby declare the following to be a full, clear, and exact description of the invention, such as will enable others skilled in the art to which it appertains to make and use the same.

My invention relates to the class of metal-working machines having a rotating head in which one or more cutting-off tools are brought into action to cut off a pipe or bar—as, for example, in pipe-threading machines—and has for its object to provide an attachment which may be sold independently of the machines themselves and may be readily applied to machines already in use for the purpose of actuating the cutting-off tools automatically after the attachment has been set. As the regular operations of the machine have nothing to do specifically with my present invention, I shall confine my description to the attachment itself.

Figure 1:
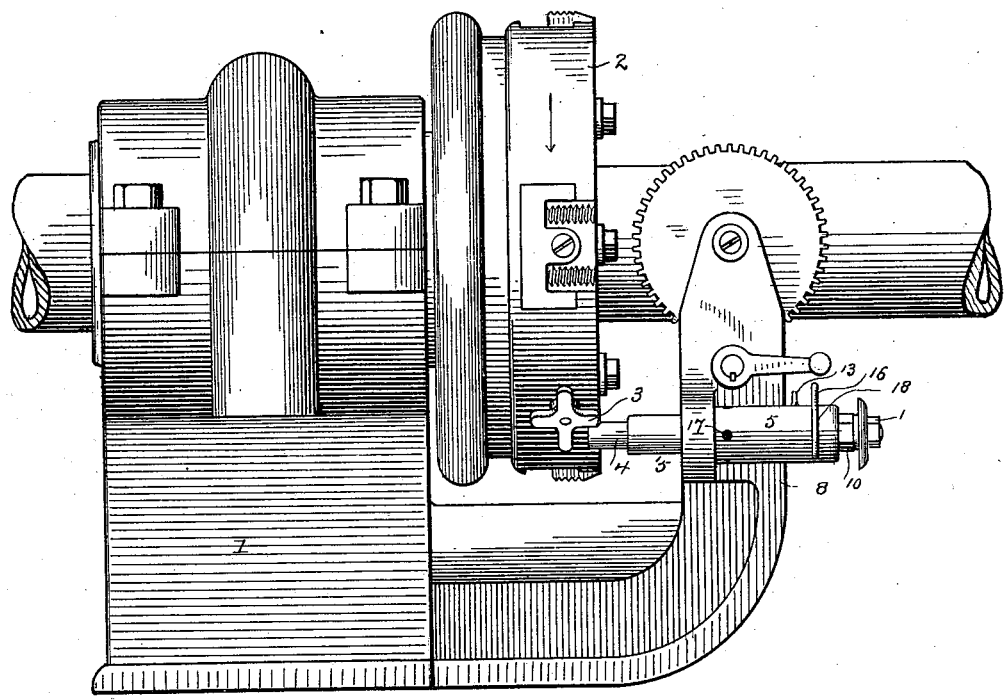
Figure 2:
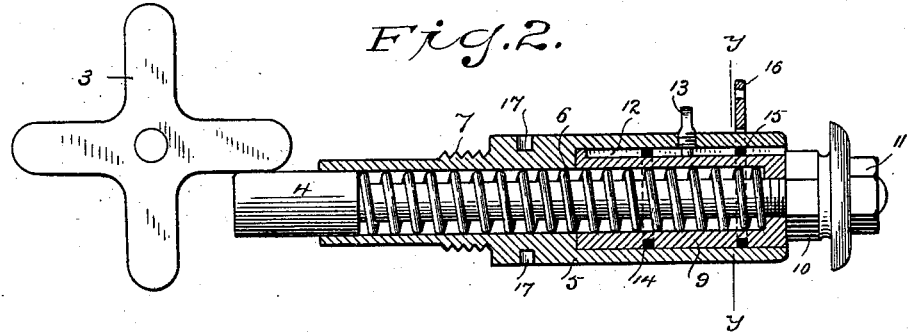
Figure 3:
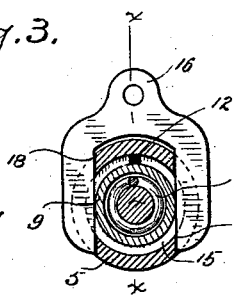

In the accompanying drawings, forming part of this specification, Figure 1 is a side elevation of a pipe-threading and cutting-off machine, illustrating the application thereto of my novel attachment; Fig. 2, a section, on an enlarged scale, of the attachment itself; and Fig. 3 is a section on the line $y\ y$ in Fig. 2.

1 denotes the base of a metal-working machine, and 2 a rotating head in which the cutting-off tools are mounted. The cutting-off tools are actuated when in use by screws, (not shown,) at the outer ends of which are feeding-wheels 3, provided with arms by which they are operated in use. I have not shown the cutting-off tools or the screws, but simply one of the feeding-wheels by which a screw and cutter are operated. In practice one or more cutting-off tools may be used, each of which is operated by a feeding-wheel having a plurality of arms. My novel attachment for actuating the feeding-wheels consists of an engaging-pin 4, carried by a case 5 and normally held forward in operative position by a spring 6, lying within the case, the special function of which will presently be fully explained. The case may be attached in place in any ordinary or preferred manner. In the drawings I have shown the case as provided with an external screw-thread 7, which is adapted to engage any convenient portion of the frame of the machine—as, for example, an arm 8, extending upward from the bed. I have shown the shank of the engaging-pin as reduced in diameter and the spring as coiled about the reduced portion and bearing against a shoulder at the end of the reduced portion and against the base of a sliding sleeve 9, which is provided with an opening through which the reduced end of the engaging-pin passes, said reduced end being threaded and engaged by a nut 10, and said nut 10 being locked in position by a set-nut 11. The sleeve is provided with a longitudinal groove 12, which is engaged by a screw-pin 13, which limits the outward movement of the sleeve and holds the sleeve against rotation, and also with circular grooves 14 and 15, either of which is adapted to be engaged by a key 16, which likewise engages grooves 18 on opposite sides of the case and by which the sleeve and engaging-pin may be locked at either the forward or retracted position. In the drawings I have shown the engaging-pin in the forward position and as locked there by the engagement of the key with groove 15 in the sleeve. By that I mean a position in which the forward end of the engaging-pin is locked in the path of rotation of the arms of the feeding-wheel, so that during each rotation of the head an arm of each of the feeding-wheels will be engaged by the engaging-pin and rotary movement imparted to the screws which actuate the cutting-off tools. In the present instance I have shown the feeding-wheels as provided with four arms. It follows, therefore, that at each rotation of the head each of the feeding-wheels will receive a quarter-rotation through the engagement of one of its arms with the engaging-pin and a corresponding forward movement will be imparted to the feed-screw and the cutting-off tool. (Not shown.) When the cutting-off tools are not in use, the operator withdraws the key, retracts the engaging-pin and sleeve, and locks said parts at the retracted position by placing the key in engagement with circular groove 14 in the sleeve and grooves 18 in the case. When the engaging-pin is at the retracted position, the regular operations of the machine may proceed in the usual manner.

When it is desired to cut off a pipe or rod, the operator removes the key from grooves 14 and 18, moves the engaging-pin and sleeve forward, and then locks said parts in the operative position by placing the key in engagement with groove 15 in the sleeve and grooves 18 in the case, as shown in the drawings. The use of the spring 6 is a vitally important feature of my invention, as in starting it insures that the engaging-pin will position the feeding-wheel no matter in what position the arm of the latter may present itself—as, for example, should an arm of the feeding-wheel present itself at such an angle as to strike the engaging-pin at or below the dead-center.

As it is impossible to insure that the arms of the feeding-wheel will always strike the engaging-pin above the dead-center, it is obviously necessary to provide that the engaging-pin shall yield so as to avoid breaking the machine and also to provide sufficient power to insure that the feeding-wheel shall be rotated as soon as the force of the blow has been taken up. For this reason a strong spring is provided, which will yield should the arm of the feeding-wheel strike the engaging-pin at or below the dead-center, but will carry the feeding-wheel forward as soon as the force of the blow is taken up.

Should it happen from any cause whatever that the tool-holder (not shown) should be fed forward far enough so that the holder itself would come in contact with the pipe or rod that is being cut off, the spring will permit the engaging-pin to yield, so as to stop the feed and prevent damage to the machine.

17 denotes holes in the case which are adapted to receive a pin or other setting-tool in attaching the case to the arm. I do not wish to be understood, however, as limiting myself to any special means for attaching the case to the machine.

Having thus described my invention, I claim—

An attachment for operating cutting-off tools in metal working machines consisting essentially of an engaging pin adapted to be placed in position to be engaged by the arms of a cutter feeding wheel, a sliding sleeve provided with grooves 14 and 15, a spring bearing against the sleeve and the engaging pin and permitting the latter to yield, a case by which the sleeve and engaging pin are carried and which is provided with grooves 18 and a key adapted to engage grooves 18 in the case and either groove 14 or groove 15 in the sleeve to lock the sleeve and engaging pin at either the retracted or forward position.

In testimony whereof I affix my signature in presence of two witnesses.

JAMES F. CRUDGINTON.

Witnesses:
A. M. WOOSTER,
S. V. RICHARDSON.